US006622392B1

(12) United States Patent
Bourget

(10) Patent No.: US 6,622,392 B1
(45) Date of Patent: Sep. 23, 2003

(54) TARGET WITH DIFFRACTIVE ELEMENTS FOR USE WITH LASER BEAM GENERATING DEVICES

(75) Inventor: Paul L. Bourget, Kentwood, MI (US)

(73) Assignee: Laser Alignment, Inc., Grand Rapids, MI (US)

( * ) Notice: Subject to any disclaimer, the term of this patent is extended or adjusted under 35 U.S.C. 154(b) by 0 days.

(21) Appl. No.: 09/527,372

(22) Filed: Mar. 16, 2000

Related U.S. Application Data
(60) Provisional application No. 60/125,227, filed on Mar. 19, 1999.

(51) Int. Cl.[7] ............................. G02B 5/00; G02B 5/18; G01C 15/00
(52) U.S. Cl. ........................................ 33/293; 359/566
(58) Field of Search ................................ 359/452, 453, 359/566, 617, 599, 565; 33/293–296, 286

(56) References Cited

U.S. PATENT DOCUMENTS

| | | | |
|---|---|---|---|
| 563,836 A | | 7/1896 | Blondel et al. |
| 2,726,573 A | | 12/1955 | Maloff ........................ 88/28.93 |
| 3,116,557 A | | 1/1964 | Trice, Jr. ......................... 33/46 |
| 3,279,070 A | | 10/1966 | Blount et al. ................... 33/46 |
| 4,418,986 A | | 12/1983 | Yata et al. .................. 350/128 |
| 4,469,407 A | * | 9/1984 | Cowan et al. ............... 350/314 |
| 4,496,216 A | * | 1/1985 | Cowan .................... 350/162.17 |
| 4,668,080 A | * | 5/1987 | Gale et al. ..................... 355/51 |
| 4,911,529 A | | 3/1990 | Van De Ven ................ 350/127 |
| 4,919,518 A | | 4/1990 | Ogino et al. ................. 350/128 |
| 4,927,262 A | | 5/1990 | Schwartz ..................... 353/13 |
| 4,970,794 A | | 11/1990 | Buckley ........................ 33/293 |
| 5,046,793 A | * | 9/1991 | Hockley et al. ............... 359/12 |
| 5,095,629 A | | 3/1992 | Klemer et al. ................ 33/293 |
| 5,243,398 A | | 9/1993 | Nielsen ...................... 356/138 |
| 5,291,318 A | * | 3/1994 | Genovese ..................... 359/17 |
| 5,465,493 A | | 11/1995 | Sobottke et al. .............. 33/286 |
| 5,479,238 A | * | 12/1995 | Whitney ....................... 355/53 |
| 5,621,531 A | | 4/1997 | Van Andel et al. ......... 356/399 |
| 5,760,834 A | * | 6/1998 | Rostoker ..................... 348/333 |
| 5,796,499 A | * | 8/1998 | Wenyon ........................ 359/15 |
| 5,887,009 A | * | 3/1999 | Mandella et al. .............. 372/6 |
| 5,999,281 A | * | 12/1999 | Abbott et al. ................. 359/15 |
| 6,061,135 A | * | 5/2000 | Levitt et al. ................. 356/354 |
| 6,094,273 A | * | 7/2000 | Asher et al. ................. 356/615 |
| 6,097,530 A | * | 8/2000 | Asher et al. ................. 359/288 |
| 6,123,845 A | * | 9/2000 | Asher et al. ........... 210/500.22 |
| 6,160,606 A | * | 12/2000 | Sprague ...................... 349/159 |
| 6,208,465 B1 | * | 3/2001 | Schaham .................... 359/558 |
| 6,271,966 B1 | * | 8/2001 | Tanabe et al. ............... 359/566 |
| 6,469,831 B2 | * | 10/2002 | Iizuka ......................... 359/565 |
| 2001/0015848 A1 | * | 8/2001 | Nakai ......................... 359/565 |
| 2001/0033400 A1 | * | 10/2001 | Sutherland et al. ........... 359/15 |

FOREIGN PATENT DOCUMENTS

| | | |
|---|---|---|
| WO | WO9533972 | 12/1995 |

* cited by examiner

*Primary Examiner*—Christopher W. Fulton
*Assistant Examiner*—Gail Verbitsky
(74) *Attorney, Agent, or Firm*—Van Dyke, Gardner, Linn & Burkhart, LLP

(57) ABSTRACT

A target for use with a laser generating device is disclosed which diffracts a reference laser beam of light directed to the target along an optical axis of the target to provide a diffracted beam of light offset from the optical axis which is more easily visible to a detector, such as a human eye. Preferably, the diffracted beam includes at least one lobe offset from the optical axis at least 40° and, further, is diffracted in a multi-lobe pattern. For example, the target body may include diffractive bodies either in the substrate forming the body or on a carrier member which is mounted to the target body. The diffractive bodies are dimensioned on the same order of magnitude as the wavelength of the light of the reference laser beam of light. Preferably, the diffractive bodies have a diameter in a range of approximately 0.1 microns to 5.0 microns, more preferably, 0.1 microns to 2.0 microns and, most preferably, 0.5 microns to 1.0 microns. The diffractive bodies may be formed by a colloidal suspension in the optical material or may be dispersed in the substrate forming the target body prior to molding.

39 Claims, 9 Drawing Sheets

POLAR INTENSITY PLOT

OFF AXIS PARABOLIC CYLINDERS

SINGLE PARTICAL POLAR INTENSITY FUNCTION

DIFFRACTION TARGET

| NEW TARGET MATERIAL | | | | |
| --- | --- | --- | --- | --- |
| INTENSITY PLOTS | | | | |
| | Irradiance (uW/sq mm) | | Power (uW) | |
| Angle | Bead Blast | Diffraction | Bead Blast | Diffraction |
| 0 | 4.854 | 4.688 | 381.0 | 368.0 |
| 10 | 2.242 | 3.389 | 176.0 | 266.0 |
| 20 | 1.707 | 3.134 | 134.0 | 246.0 |
| 30 | 0.433 | 3.134 | 34.0 | 246.0 |
| 40 | 0.076 | 3.274 | 6.0 | 257.0 |
| 50 | 0.014 | 3.096 | 1.1 | 243.0 |
| 60 | 0.011 | 2.637 | 0.9 | 207.0 |
| 70 | 0.004 | 2.115 | 0.3 | 166.0 |
| 80 | 0.003 | 1.809 | 0.2 | 142.0 |

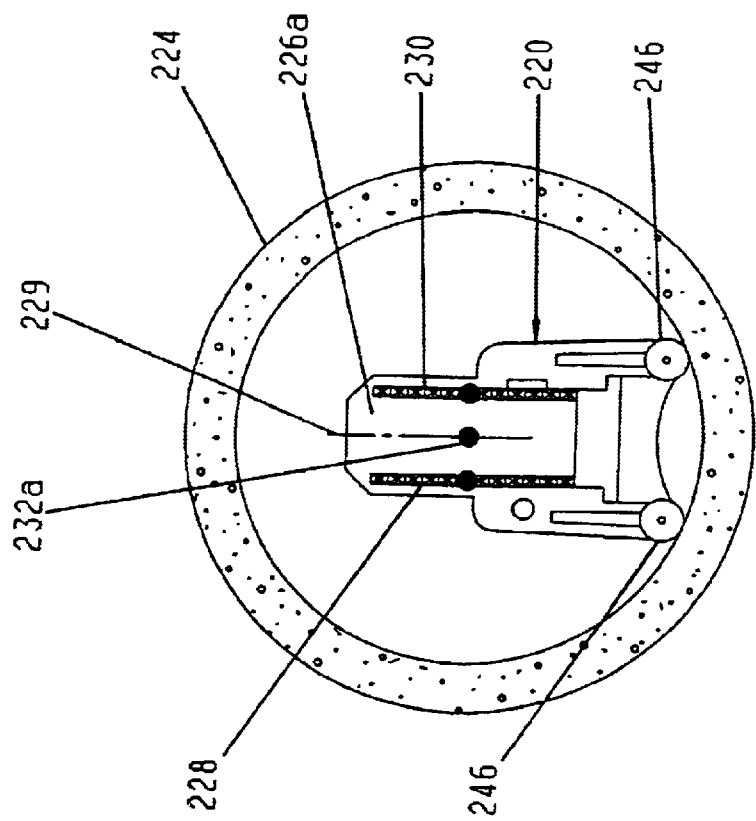
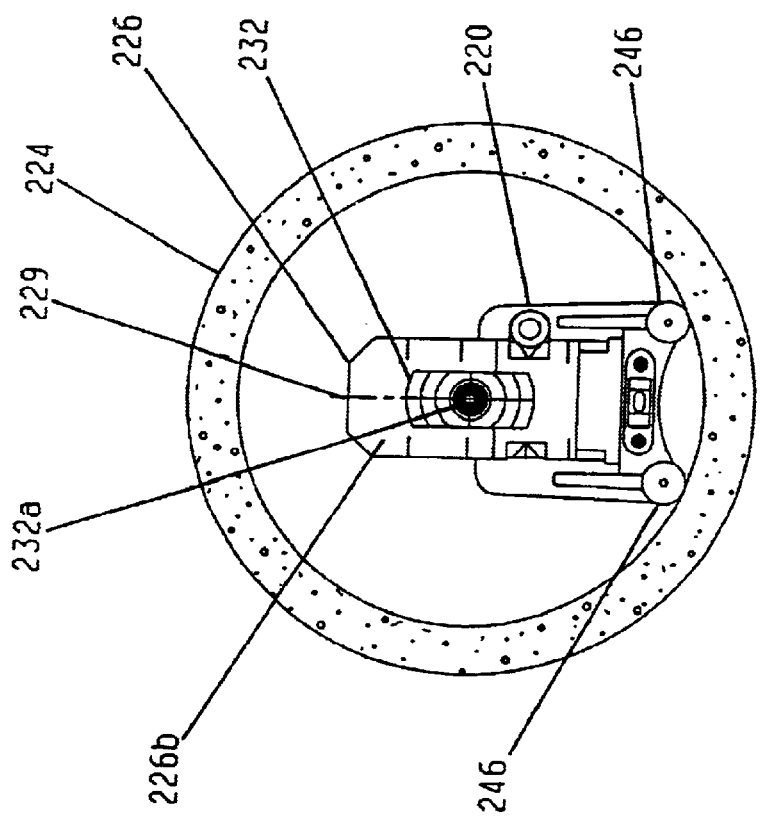
Fig. 11
Fig. 12

TARGET WITH DIFFRACTIVE ELEMENTS FOR USE WITH LASER BEAM GENERATING DEVICES

The present application claims priority from provisional application entitled "BLUE TARGET MATERIAL WITH EMBEDDED DIFFRACTIVE ELEMENTS ESPECIALLY FOR GREEN BEAM LASER," Ser. No. 60/125,227, filed Mar. 19, 1999, which is incorporated by reference herein in its entirety.

TECHNICAL FIELD AND BACKGROUND OF THE INVENTION

The present invention relates to a target for use with a laser generating device and, more particularly, to a target for use with a laser generating device which generates a reference laser beam of light for establishing a reference plane or reference line for use in construction.

Laser beam generating devices have long been used in construction applications to create a reference for leveling, aligning, setting a grade or surveying. For example, rotating laser beam projecting devices have been used to establish a reference plane for laying foundations, setting frame work, or grading. Stationary laser beams, on the other hand, have been used to establish reference lines of light. Reference lines of light are used, for example, for surveying, aligning pipes, or determining the proper height for components, such as duct work, ceiling frame work, or the like.

It is also known to use a target in combination with laser generating devices in which the laser beam is directed onto the target in order to measure height, to set a height or to position an object to which the target is mounted, or to position a laser to a desired orientation. Targets typically have some indicia, for example concentric circles, vertical lines, horizontally spaced lines or the like. For example, when aligning a pipe, a stationary laser beam generating device is positioned on one end of the pipe and a target is placed on the other end of the pipe so that when the light beam from the laser generating device intercepts the target at a desired position on the target, the pipe is properly positioned or aligned. These targets can be, therefore, used as a reference for setting and aligning the pipe at a desired grade and azimuth and, further, for establishing a reference for excavation of the trench and grading of the sub-bedding beneath the piping. However, in order to determine whether the laser beam is properly positioned on the target, the operator must detect where the laser beam hits the target—for example, whether the laser beam hits the center or bulls-eye of the target. Since piping is often laid in a trench beneath the ground surface, it is often hard for the operator of the laser system to detect where the beam passes through the target relative to the indicia on the target.

In an effort to enhance the visibility of the reference beam, lasers using different portions of the optical spectrum have been developed, for example, lasers generating laser beams in the green portion of the optical spectrum. In addition, targets have been developed that employ a refractive surface in order to bend the light from the reference beam up to the detector, such as the operator, to orient the laser beam so that it is more visible. A common refractive surface that is employed is a spherical shape either with a positive or negative focus. The shape is either molded or bead blasted onto the optical material forming the target. Simple refractive surfaces exhibit a dipole like radiation pattern illustrated in FIG. 2. This dipole-like-radiation pattern, however, creates a low brightness function for the eye due to the rather large solid angle over which the refracted light transmits. For example, most optical plastics have a total internal reflection of 1.47 and, therefore, such surfaces are limited to refracted angles of less than 55° due to the law of total internal reflection. Complex refractive surfaces, such as parabolic, cylindrical, or toric, have been used to bend more light toward the detector by adding an off-axis shift to the dipole pattern. However, these complex refractive surfaces still have a basic restriction due to the law of total internal reflection. In addition, referring to FIG. 3, a complex refractive surface refracts light over a large solid angle. While the brightness function may posses a slight improvement due to the offset axis shift, these complex refractive surfaces are more expensive to manufacture due to molding and cutting.

Consequently, there is a need for a target which can bend the light from a laser generating device to produce a bright or intense light that forms a high angle with respect to the optical axis of the target so that the position of the laser beam on the target is more easily detected by a detector, such as a human eye.

SUMMARY OF THE INVENTION

According to the present invention, a target for a laser beam generating device exhibits high intensity or brightness while bending the light at a high angle with respect to the optical axis of the target so that the position of the laser beam as it passes through the target is more easily detected by a detector, such as a human eye.

In one form the invention, a laser target for use with a laser generating unit includes a target body which is formed from an optical material and has an optical axis. The target body is adapted to diffract a reference laser beam of light which is directed to the target body along the optical axis to provide a diffracted beam which is more visible to a human eye.

In one aspect, the body diffracts the laser beam in a multi-lobe pattern, in which at least one of the lobes is angled greater than 40° from the optical axis of the target body, more preferably, greater than 50° from the optical axis and, most preferably, greater than 60°. For example, the multi-lobe pattern may include more than three lobes.

In further aspects, the optical material is adapted to diffract the laser beam. For example, the optical material may include a plurality of diffractive bodies which diffract the laser beam. In preferred form, the diffractive bodies are dimensioned on the same order of magnitude as the wave length of the light generated by the laser generating unit. Preferably, the diffractive bodies comprise generally spherical particles. Suitable diffractive bodies include, for example, macromolecules, and have dimensions in a range of approximately 0.1 microns to 5.0 microns and, more preferably, in a range of approximately 0.1 microns to 2.0 microns.

In another form of the invention, a laser target for use with a laser generating unit includes a target body formed from an optical material with the target body having an optical axis. The target body includes a plurality of diffractive bodies that diffract a reference laser beam of light which is directed to the target along the optical axis to produce at least one diffracted beam at an angle in a range of about 40° to 90° from the optical axis of the target body.

In one aspect, the body includes a carrier which includes the diffractive bodies. For example, the carrier may comprise a tape with the diffractive bodies, for example, etched onto the tape or provided on the tape in the form of a hologram.

In another aspect, the target body comprises an optical material having a colloidal suspension for diffracting the reference laser beam in a multi-lobe pattern. For example, the optical material may comprise a polymer.

According to yet another form of the invention, a laser target for use with a laser beam generating device is formed by molding a target body and adapting the body to diffract a reference laser beam of light directed toward the target body along the target body's optical axis.

In one aspect, the target body is molded from a polymer with diffractive bodies. For example, the diffractive bodies may be formed by forming a colloidal suspension in the polymer. In another aspect, a carrier having a plurality of diffractive bodies is provided and is applied to the target body. For example, the carrier may be affixed to the target body by an adhesive. In another aspect, submicron dots may be formed on the carrier to provide the diffractive bodies. For example, the submicron dots may be formed by depositing the submicron dots on the carrier. Alternately, the diffractive bodies may be formed by photo-etching the carrier with the submicron dots.

These and other objects, advantages, purposes, and features of the invention will become more apparent from the study of the following description taken in conjunction with the drawings.

DETAILED DESCRIPTION OF THE DRAWINGS

FIG. 11 is a cross-sectional view taken along line XII—XII of FIG. 10;

FIG. 12 is a cross-section view taken along line XIII—XIII of FIG. 10;

DETAILED DESCRIPTION OF THE PREFERRED EMBODIMENTS

Figure 6:
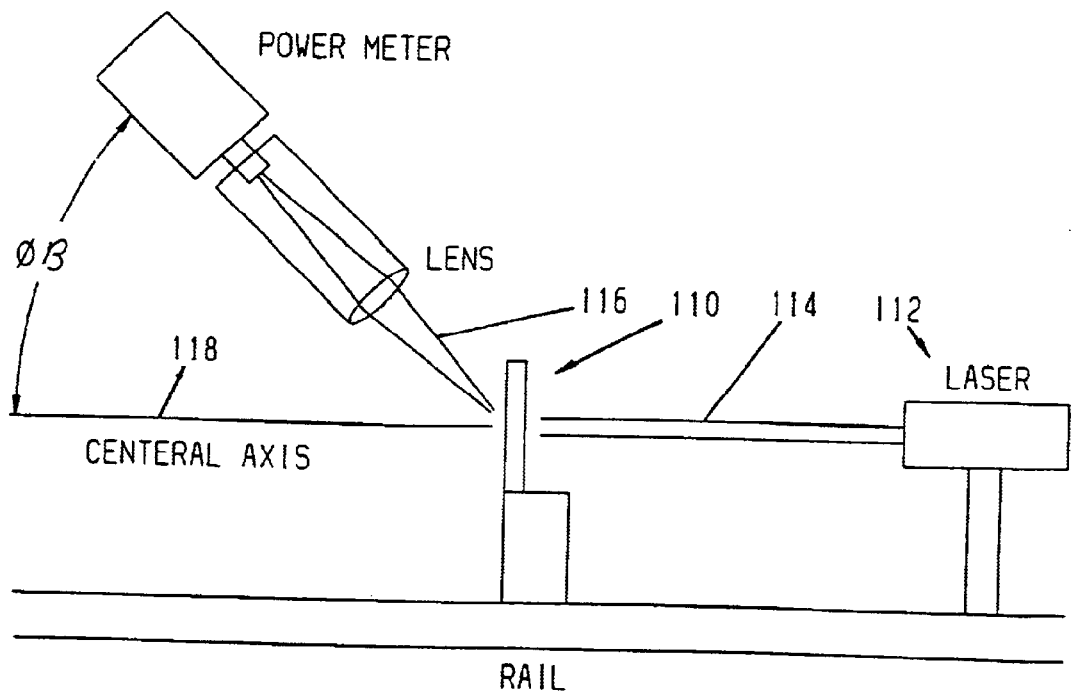
FIG. 6 is a schematic representation of the target of the present invention refracting a laser beam of light generated by a laser and directing the light to a power meter.

Referring to FIG. 6, the numeral 110 generally designates a laser target of the present invention. Laser target 110 is particularly suitable for use with a laser beam generating device 112, which generates a reference laser beam of light 114 and which is directed to target 110 to establish a reference line or plane for such purposes, including leveling, measuring, surveying, aligning, or the like. Examples of suitable laser generating devices include green laser beam generating devices described in U.S. Pat. No. 5,465,493; PCT Publication No. WO 95/33972, the disclosures of which are incorporated by reference herein in their entireties and laser beam generating devices disclosed in U.S. Pat. No. 5,287,365; 5,621,531; 5,689,330; and 5,953,108, which are commonly assigned to Laser Alignment, Inc. of Grand Rapids, Mich., the disclosures of which are incorporated by reference in their entireties. As will be more fully described below, target 110 bends the light from the laser generating device by diffraction. Unlike refraction, diffraction is the bending of light around an object. In addition, in contrast, diffraction bends light in a manner that is independent of the index of refraction of the material forming the target.

Target 110 may be placed at a desired height or location such that when the laser beam 114 impinges on target 110, the laser generating unit 112 can be adjusted until the reference laser beam is properly aligned with the target to establish a reference line for excavating, leveling, or surveying as is known in the art. Alternatively, the target can be mounted on an object so that when the object is positioned such that the laser beam impinges the target at a desired point, the object is properly aligned. For example, a target can be mounted on a beam or frame which is to be positioned in a desired orientation, for example beams or frames of a ceiling such as described in U.S. Pat. No. 3,775,929, which is commonly assigned to Laser Alignment, Inc. of Grand Rapids, Mich., which is incorporated by reference herein in its entirety.

Laser generating device 112 preferably generates a laser beam having a wave length in a range of approximately 0.1 microns to 4.0 microns, more preferably, 0.4 microns to 0.7 microns and, most preferably, 0.5 microns to 0.65 microns. In most preferred form, laser generating device 112 generates a laser beam in the green portion of the optical spectrum with a wave length of about 0.53. Preferably, target 110 includes reference indicia which permits an operator to locate the reference beam 114 on the target, as will be more fully described below, so that either the laser beam generating device 112 or the object to be positioned can be adjusted to align the reference beam 114 on the desired indicia. When aligning pipe, for example, once aligned, the reference laser beam 114 may be used to establish a line for excavating, surveying, leveling, or further positioning as noted above.

In the present invention, target 110 is adapted to diffract the reference laser beam 114 whereby the diffracted beam of light 116 forms an angle β with respect to optical axis 118 of target 110, with angle β preferably exceeding 40°, more preferably, 50° and, most preferably, exceeding the angles associated with refracted beams from conventional laser targets, for example angles greater than 60°. In addition, target 110 refracts the reference laser beam 114 in a manner to produce a refracted beam 116 with a greater intensity or brightness or high contrast ratio which allows enhanced detection by a detector, for example by a human eye, an energy detector or photo detectors, such as a CCD array, photo-array, CMOS camera, or the like.

Figure 5:
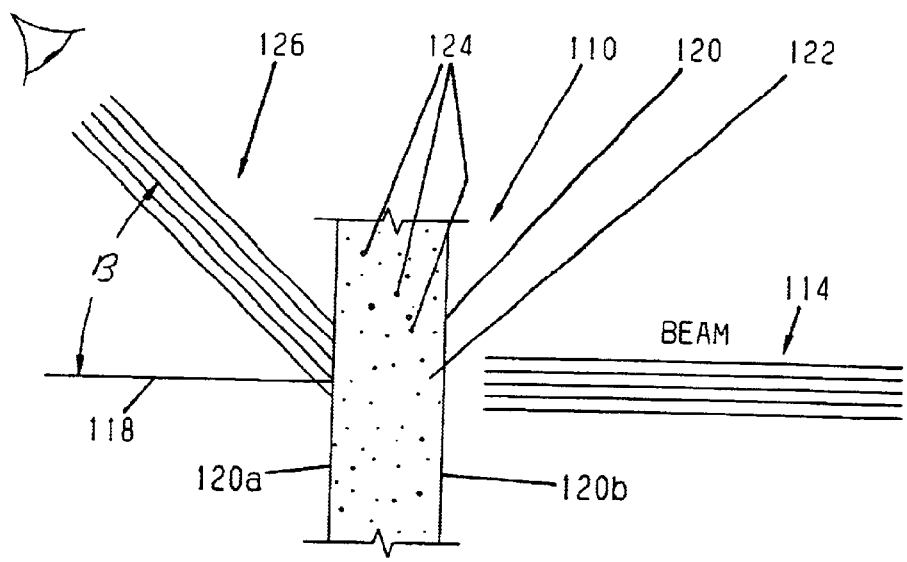
FIG. 5 is a schematic view of a target of the present invention diffracting a laser beam of light for directing the laser beam of light to a detector, such as a human eye.

Referring to FIG. 5, target 110 includes a body 120 formed from an optical substrate 122 with a plurality of diffractive bodies 124. In one preferred form, the diffractive bodies are dispersed through substrate 122. Diffractive bodies 124 may comprise macromolecules or particles which have a dimension on the same order of magnitude as the wave length of the light generated by laser generating device 112. For example, diffractive bodies 124 preferably have a diameter or are dimensioned in a range of approximately 0.1 microns to 5.0 microns and, more preferably, approximately 0.1 microns to 2.0 microns and, most preferably, about 0.5 microns to 1.0 microns. In most preferred form, diffractive bodies 124 have diameters or are dimensioned of approximately 0.53 microns to 0.64 microns. Diffractive bodies 124 may assume a variety of shapes, including for example cylinders or spheres, and are preferably generally spherical and cause the reference laser beam of light to bend around the respective diffractive particles at an angle preferably greater than 40°, more preferably, greater than 50° and, most preferably, greater than 60°. This increased angle achieved by the diffracted beam 126 is particularly useful when the detector, such as the operator, must view the target either from above, for example when laying pipe in a trench, or from below, when leveling or surveying an elevated structure. From Rayleigh's work, small particles, such as particles having a magnitude on the order of the wave length of light, bend light when acted upon by a uniform field of radiation. When particles are much smaller than the wave length of light, the diffracted light follows a simple dipole pattern. Where particles are about the same size as the wave length of light, the diffracted light follows a more complex Fraunhofer like pattern with a multi-lobe pattern with many high intensity lobes generated at very high angles relative to the central optical axis.

Figure 1:
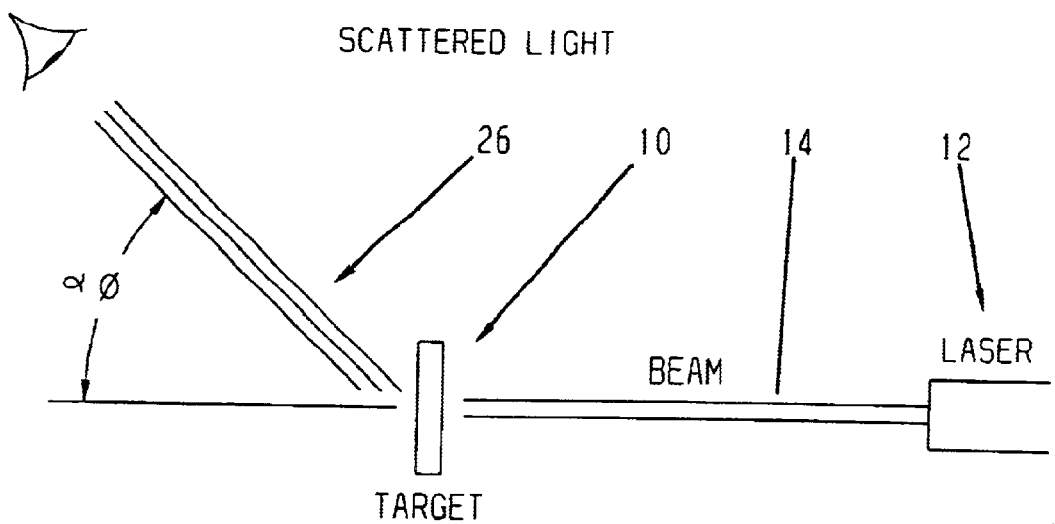
FIG. 1 is a schematic view of a prior art target which refracts the beam of light from a laser beam generating device toward a detector.
Figure 2A:
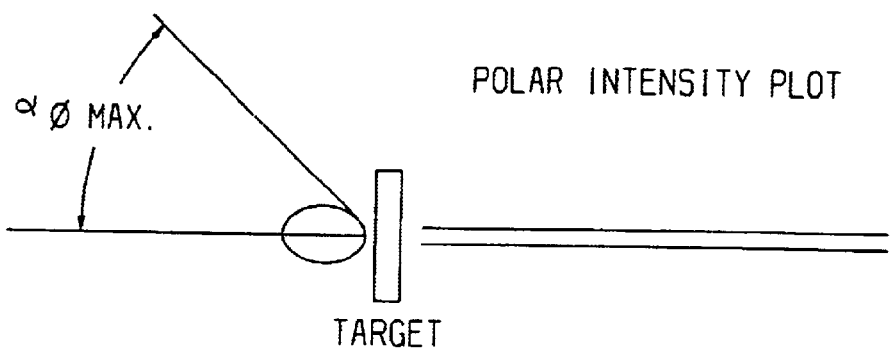
FIG. 2A is a schematic representation of a polar intensity plot of a refracted laser beam of a prior art target which employs a refractive surface to bent the laser beam.
Figure 2B:
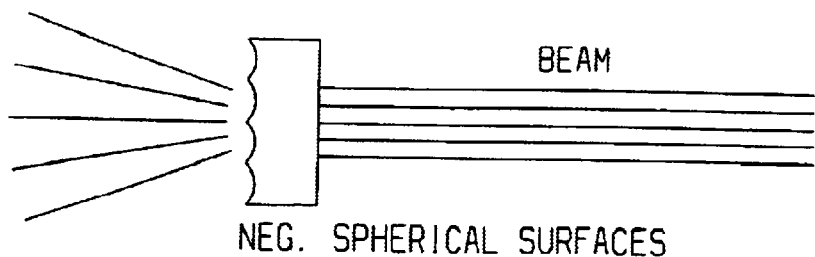
FIG. 2B is a schematic illustration of a prior art target with spherical surfaces for refracting the laser beam.
Figure 3A:
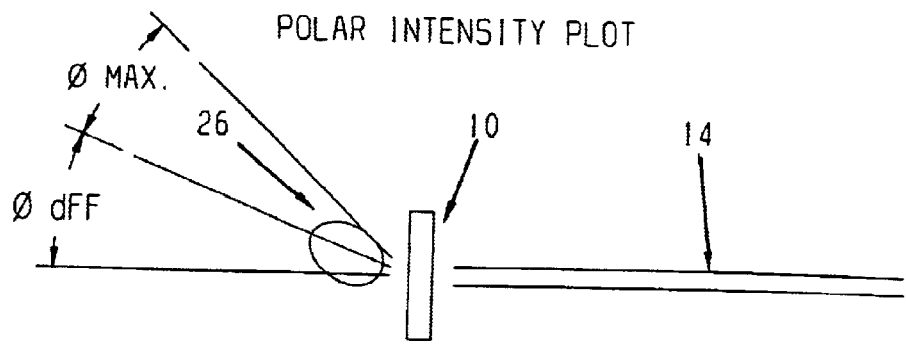
FIG. 3A is a schematic representation of a polar intensity plot of a target with a complex refractive surface which bends the beam of light along an offset axis.
Figure 3B:
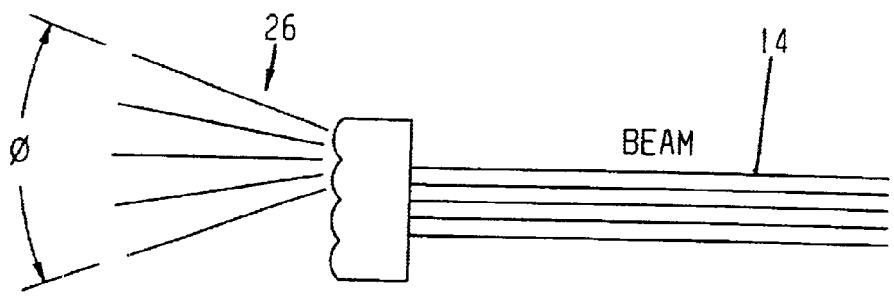
FIG. 3B is a schematic representation of a prior art target incorporating a complex refractive surface for bending the laser beam of light.
Figure 4:
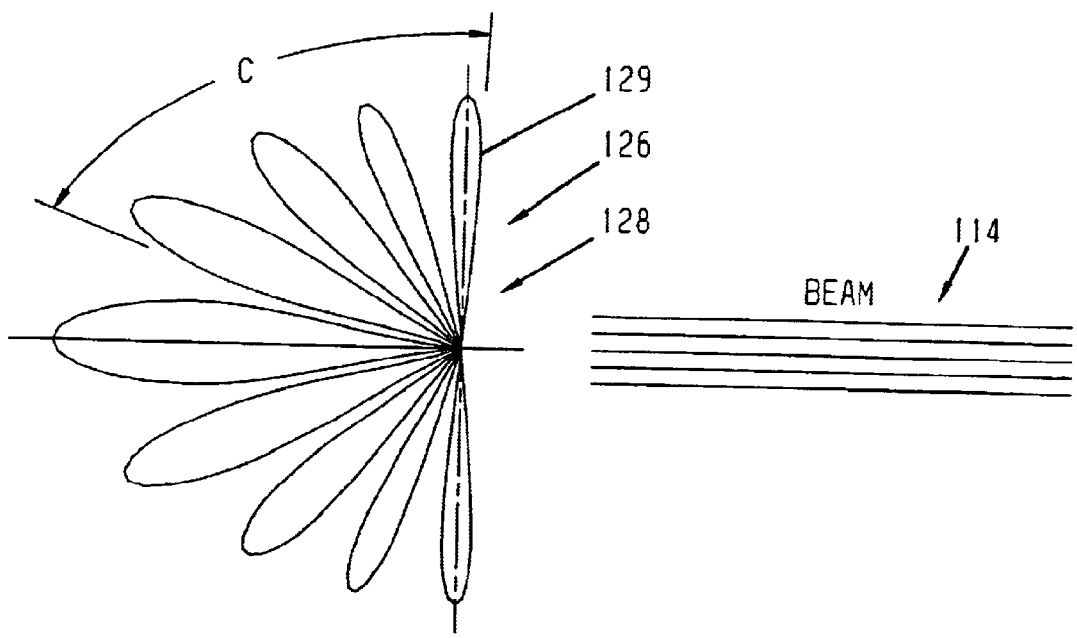
FIG. 4 is a graph illustrating a single particle polar intensity function of a beam of light as it passes through a target of the present invention.

Referring to FIG. 4, diffracted beam 126 preferably includes a multi-lobe pattern 128, having at least three lobes, more preferably, five lobes and, most preferably, at least nine lobes, with at least one lobe angled preferably greater than 40° with respect to optical axis 118, more preferably, greater than 50° and, most preferably, greater than 60°. It should be understood that an even greater number of lobes can be generated depending on the diffractive mechanism. In addition, each lobe 129 diffracts over a limited or small angular arc preferably in a range of 0.1 to 1.0 sr (sterradian) and, more preferably, 0.1 to 0.3 sr. Furthermore, lobes 129 extend over an angular arc, C, of greater than 70°. Moreover, at least one lobe can be visible when viewing from behind the target as it is bent at angles greater than 90° as measured from the horizontal optical axis of the target. This type of diffraction is called Rayleigh-Gans scattering. The equation which describes the lobe intensity function is as follows:

$$I_s = I_0[(2Pi/L)^4 V^2(m-1)^2]/8Pi^2R^2 \times G(2 \times \sin \frac{1}{2}\theta)(1+\cos^2 \theta)$$

Three advantages to use this type of light scattering are: The ability to create light bending at very high angles from the optical axis of the target thus allowing the viewer greater visibility of the impingement location of the incident reference laser beam; the scattering lobes diffract over a small solid angle, for example an angle in a range of 0.3 to 1.0 sr (sterradian) and, more preferably, 0.1 to 0.3 sr (sterradian), which creates a high brightness function which is easily detected by the human eye; and, further, this type of scattering is more cost effective to implement than refractive surfaces. As described above, refractive surfaces require precise molding and/or cutting in order to create the curved surfaces which refract the light. In contrast, body 120 can be molded as a thin plate-like member with smooth outer surfaces.

Diffractive bodies 124 may be provided or formed when molding body 120, for example by adding an agent to substrate 122 before molding which creates the macromolecular spheres or diffractive particles during the curing phase of body 120. Body 120 preferably comprises a thin plate-like member or thin sheet with opposite planar or smooth sides 120a and 120b and has a thickness on the order of approximately ¹⁄₁₆ to ¼ inches and, most preferably, approximately ⅛ of an inch. These diffractive bodies constitute a colloidal suspension of particles which preferably have a diameter or are dimensioned with a range of about 0.1 microns to 5.0 microns and, more preferably, in a range of about 0.1 microns to 2.0 microns and, most preferably, in a range of approximately 0.5 microns to 1.0 micron. In most preferred form, the particles have a diameter or are dimensioned of about 0.53 microns to 0.64 microns. As a result, the particle diameter or dimension is approximately equal to the wave length of the light emitted from the laser generating device 112. The colloidal suspension has thousands of particles per cubic centimeter which averages the high intensity lobe functions of the individual particles. For example, a suitable agent may comprise inorganic compounds or organic compounds, such as polystyrene latex. Alternatively, body 120 may be formed by molding a suitable polymer, such as a plastic resin, including a clear or transparent plastic resin, in its desired shape with the diffractive bodies being dispersed into the polymer prior to molding. For example, suitable diffractive bodies include latex spheres. In addition, diffractive bodies 124 may vary in size within a range of diameters or, alternatively, have uniform sizes. With a uniform size of diffractive bodies, the diffracted light will form discrete angles with respect to the optical axis 118 of target 110.

Figures 7, 8:
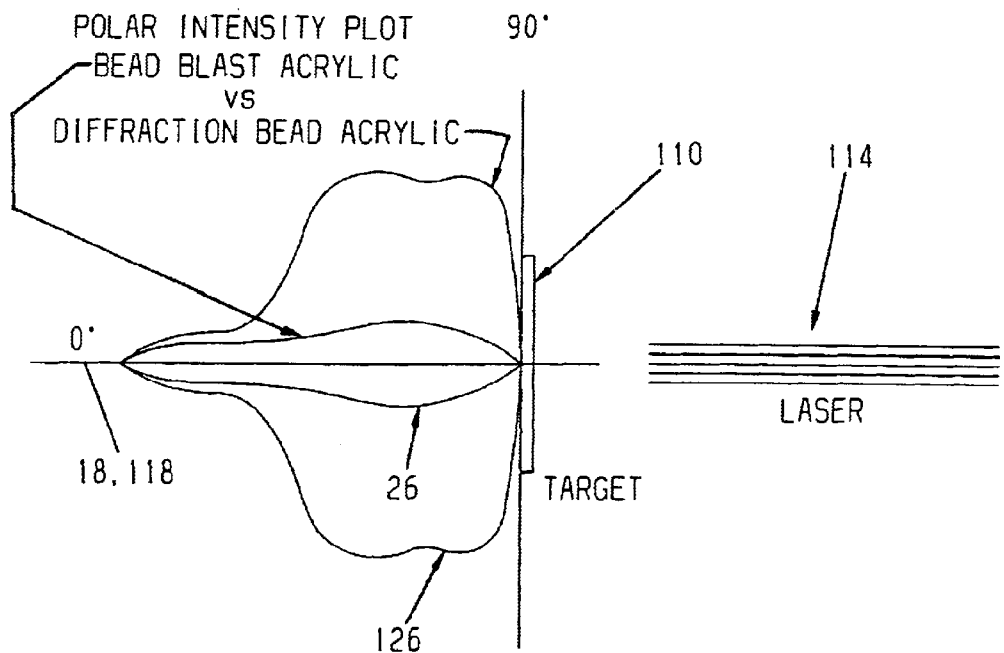
FIG. 7 is a polar intensity plot illustrating a comparison between a laser beam refracted by a bead blast target versus a laser beam diffracted by a target of the present invention.
FIG. 8 is a table comparing the irradiance and power of a laser beam refracted by a bead blast target to a laser beam diffracted by a target of the present invention.
Figure 9:
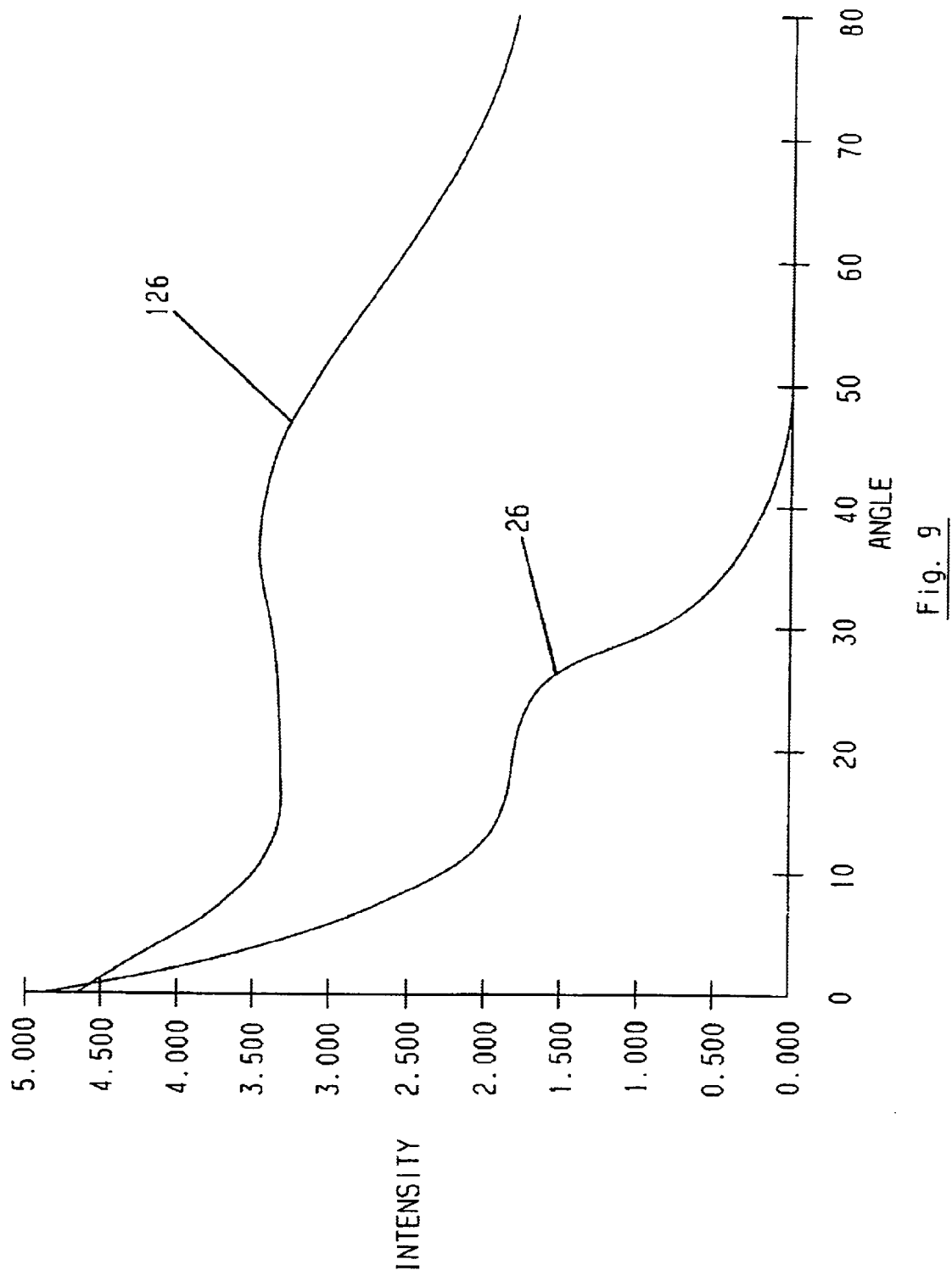
FIG. 9 is a graph of the intensity versus the angle between a laser beam refracted by a target having a bead blast acrylic compared to a laser beam diffracted by a target of the present invention.

Referring to FIGS. 7–9, the tables and graph illustrate a comparison of the irradiance, power, and intensity between the diffracted beam 126 and refracted beam 26. It can be appreciated from the data shown on the table illustrated in FIG. 8, that the irradiance and power of diffracted beam 126 is significantly greater than the corresponding irradiance and power of refracted beam 26 at any offset angle. Furthermore, the irradiance of refracted beam 26 falls off drastically at 30°, with the power of the refracted beam falling off drastically at about 50°. Therefore, it can be seen that the distinct advantage of target 110 is that the reference laser beam 114 can be bent at far greater angles yet produce far greater intensity than the refracted beam of conventional targets. Similarly, referring to FIGS. 7 and 9, the intensity of the refracted beam 26 drastically falls off at approximately 45° angle while the intensity of the diffracted beam continues essentially up to 90° with respect to the optical axis 118.

Figure 10:
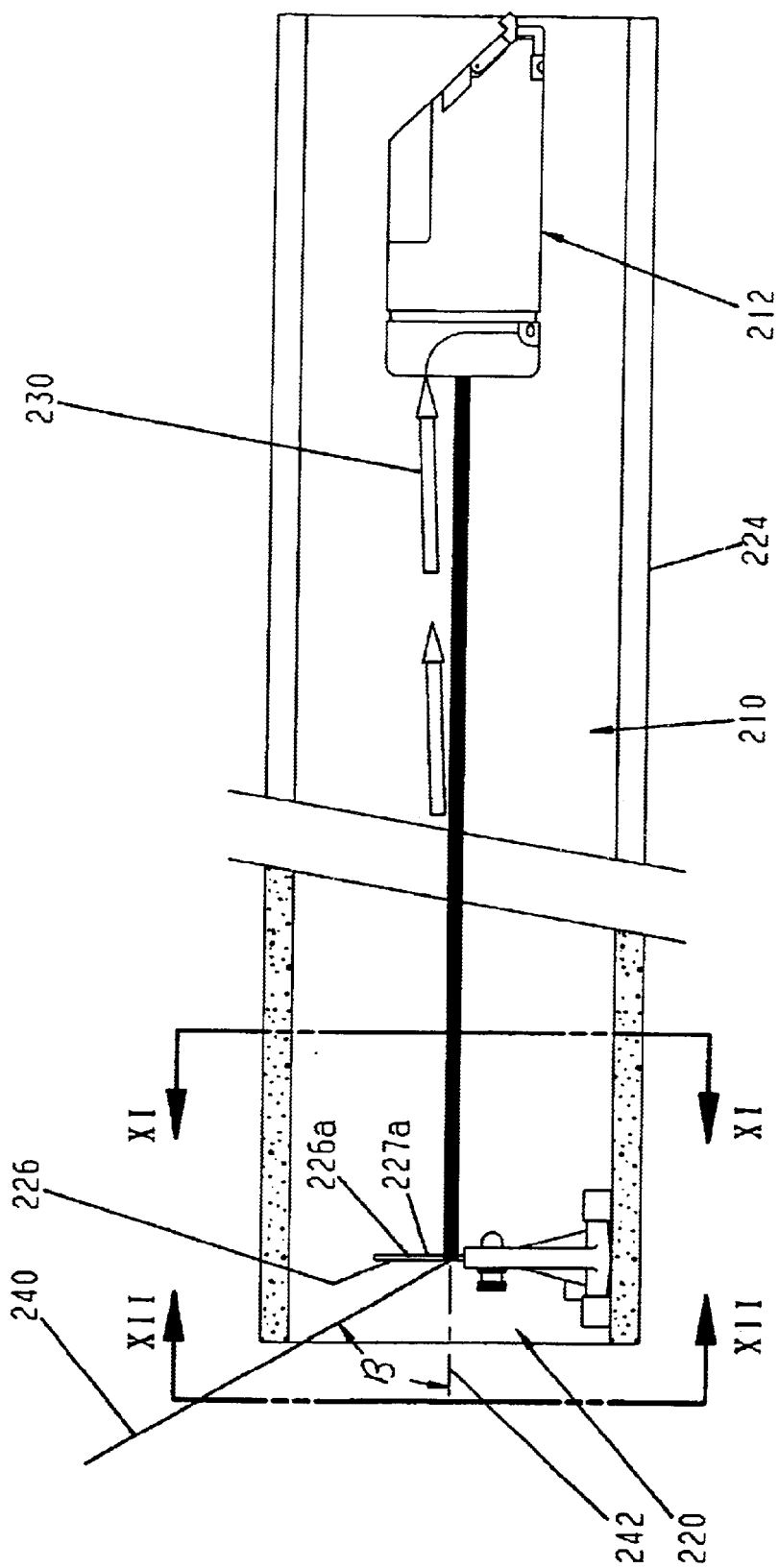
FIG. 10 is a side elevation view of a pipe aligning apparatus incorporating a target of the present invention.
Figure 14:
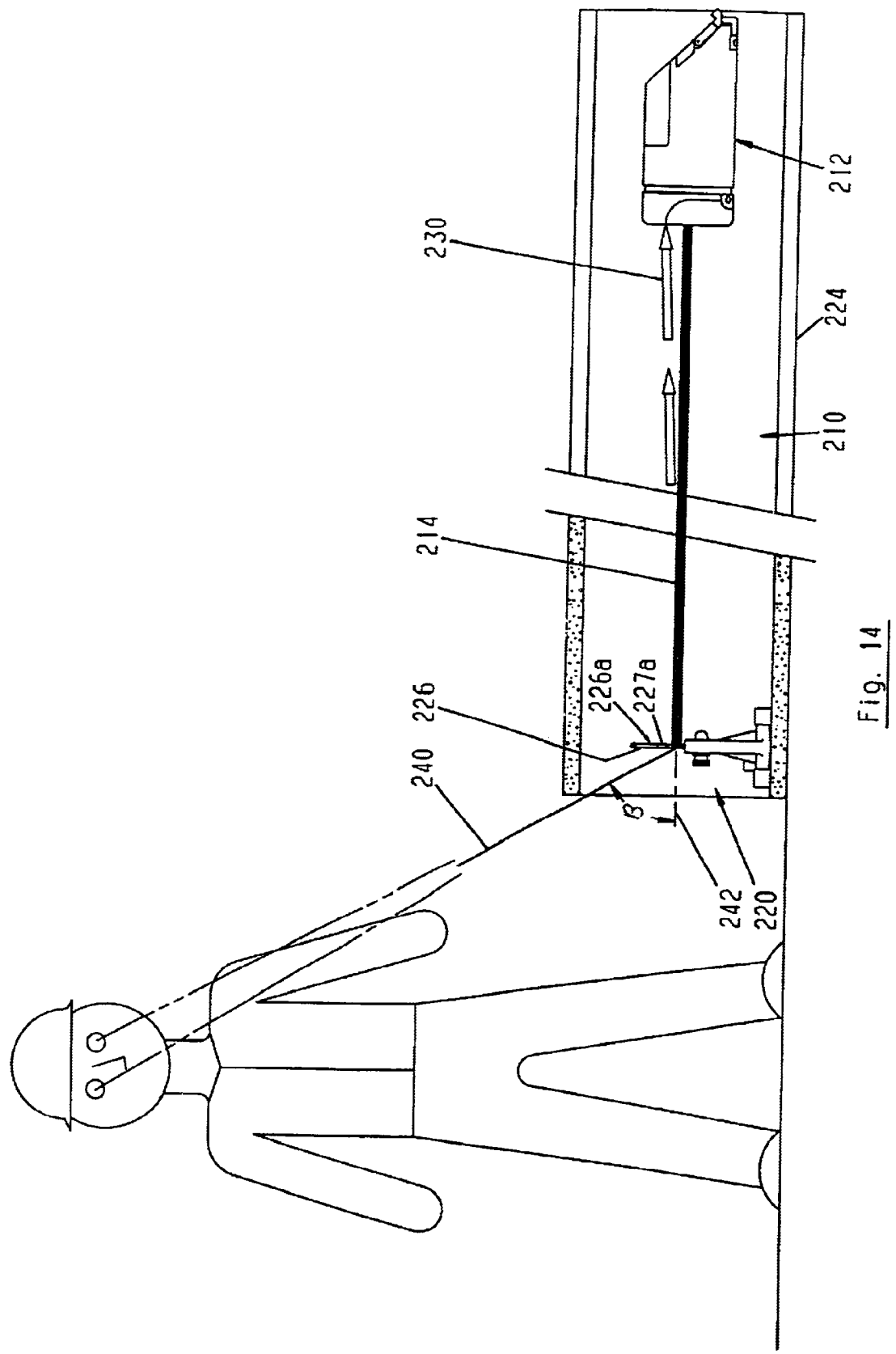
FIG. 14 is an enlarged view of FIG. 10 illustrating an operator viewing the diffracted beam.

Referring to FIGS. 10 and 14, the numeral 210 generally designates a laser beam system of the present invention. Laser beam system 210 includes a laser generating device 212 and a target assembly 220. Laser beam generating device 212 includes a source for generating a collimated beam of light and a scanning device for scanning the beam of collimated laterally to locate the laser beam on target 220.

For further details of one suitable laser generating beam device, reference is made to U.S. Pat. No. 5,621,531, which is commonly assigned to Laser Alignment, Inc. of Grand Rapids, Mich., the disclosure of which is incorporated by reference herein in its entirety. Preferably, laser beam generating device 212 emits a radiation with a wavelength ranging from 0.10 microns to 4.0 microns, more preferably, about 0.40 microns to 0.7 microns and, more preferably, in a range of about 0.5 microns to 0.65 microns which is in the green portion of the optical spectrum. Most preferably, laser beam generating device 212 emits a radiation with a wave length of approximately 0.53 microns. A suitable commercially available laser generating device is sold as 6700 Green by Laser Alignment, Inc. of Grand Rapids, Mich.

As noted above, laser generating device 212 generates a laser beam, preferably in the green portion of the optical spectrum, and directs the beam 214 to target 220. In this embodiment, target 220 may be used to set the grade for the pipe 224 in which the laser generating unit 212 and target 220 are positioned, for example on opposed ends of the pipe, or may be used to align and position a second pipe section. Target 220 includes a target body 226 similar to target body 120 of the first embodiment. Referring to FIG. 11, mounted to the inwardly facing side 226a of body 226 are a pair of retro reflector strips 228 and 230. Strips 228 and 230 reflect laser beam 214 of laser beam generating device 212 when laser beam 214 is scanned laterally so that the reflections from the retro reflector strips 228 and 230 are directed back to laser generating device 212. In response to these reflections, laser generating device 212 centers laser beam 214 laterally with respect to target body 226.

Referring to FIG. 12, outwardly facing side 226b of body 226 includes indicia 232 which may be used by the operator to establish or measure the grade of the pipe section 224. Thus, when reference laser beam 214 is fixed between the retro reflective strips 228 and 230 along axis 229 (FIG. 12), the grade of the pipe can be adjusted in a controlled manner by moving pipe section 224 until the reference beam impinges on target body 226 at a desired location as measured by indicia 232. As described in reference to the first embodiment, the point of impingement on target body 226 by reference laser beam 214 can be more easily detected by a detector, such as the human eye or an energy detector, as the diffracted beam 240 forms an angle β of preferably greater than 40° and, more preferably, greater than 50° and, most preferably, greater than 60° with respect to optical axis 242 while still providing a refracted beam with sufficient intensity to be detected by the detector. For example, by way of reference to FIG. 14, when a person is laying a pipe or placing another commodity, target 220 diffracts the light in a manner to make the laser beam of the laser generating unit more easily visible at the work surface from oblique angles which eliminates the need for the person to place his or her eyes level with the work surface, thus avoiding potential damage to the eyes of the person. It should be understood, as noted in reference to the first embodiment, that a variety of detectors may be used to detect the refracted beam, such as a digital imaging detector, a photo detector, a CCD array detector or the like.

Figure 13:
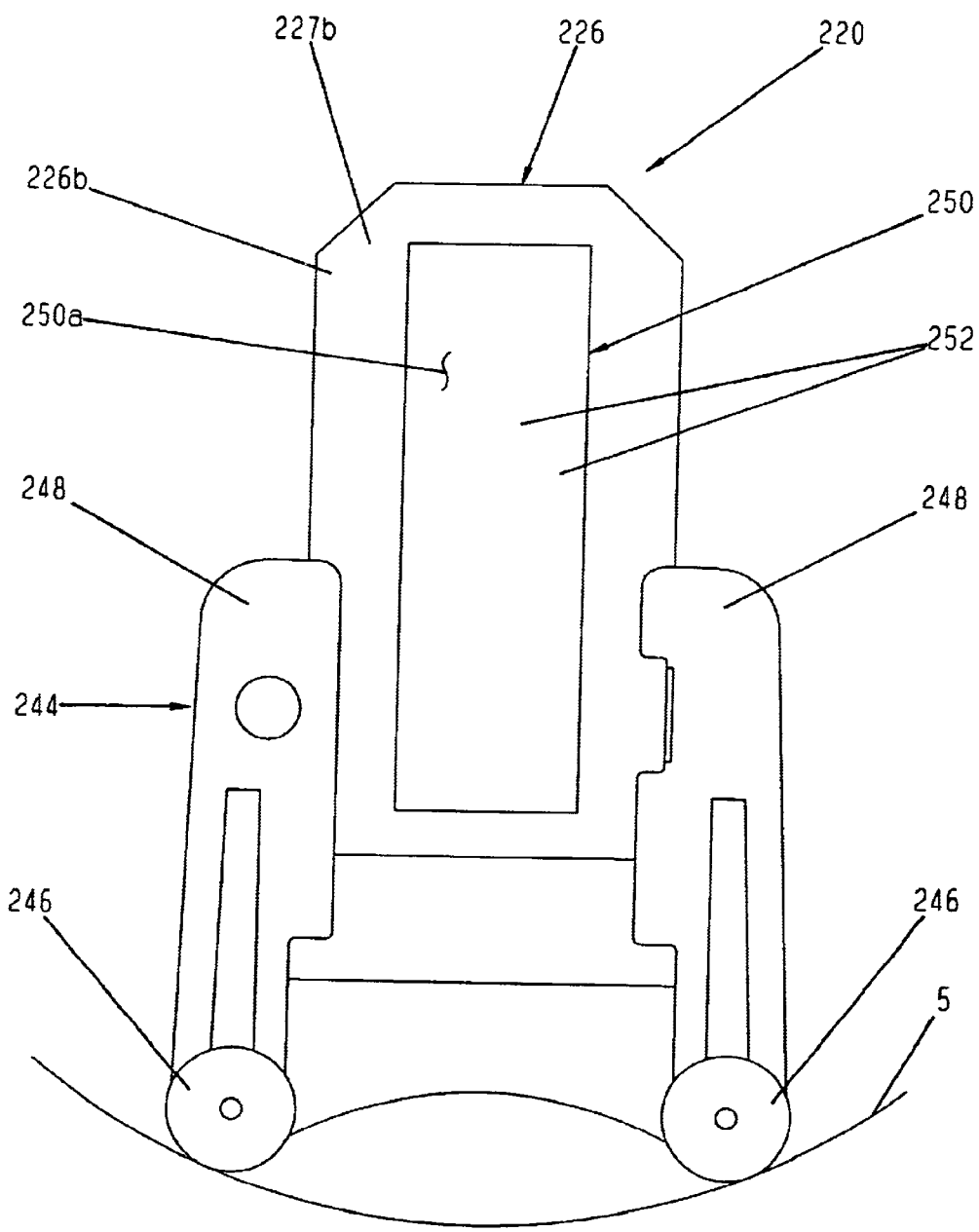
FIG. 13 is a target assembly incorporating a target of the present invention.

Referring to FIG. 13, target assembly 220 includes a frame 244 which supports target body 226 preferably spaced from a support surface such as the inside diameter of pipe section 224. Frame 244 includes a pair of feet 246 and a pair of opposed arms 248 which releasably hold target body 226 therebetween. Furthermore, arms 248 provide for vertical adjustment of body 226 to accommodate different pipe sizes. When placed in pipe section 224, bulls-eye 232a may be aligned with the center of the pipe so that when the laser beam 214 is aligned with the bulls-eye 232a, laser generating device 212 is properly set up for placement of other pipe sections and/or for use as a reference beam for grading or leveling. Similar to target body 120, target body 226 comprises a clear or transparent substrate, such as a polymer with smooth outer surfaces 227a and 227b and, further, is adapted to diffract the reference laser beam so that it is more visible to an operator of the laser system.

As best seen in FIG. 14, target body 226 may be formed with diffractive bodies in the polymer forming the body or alternatively may include a carrier member 250. Carrier member 250 includes a plurality of diffractive bodies 252 similar to diffractive bodies 124 of the previous embodiment. Diffractive bodies 252 may be formed such as by photo-etching or by providing, such as by depositing, a plurality of submicron dots onto the surface 250a of carrier 250. For example, submicron dots may be formed using ink-jet technology in which a plurality of rows and columns of submicron dots are deposited on outer surface 250a of carrier 250. Alternately, carrier 250 may include a hologram which forms the plurality of diffractive bodies 252. Reference is made to the first embodiments for the suitable range of sizes and shapes of the diffractive bodies. Carrier member 250 may comprise a tape or film which is mounted to the outwardly facing surface 226b of target body 226. For example, the tape or film may be adhered to outwardly facing surface 226b of body 226 by an adhesive. Suitable tapes or film include a transparent material, such as a transparent film, with or without coatings, such as polyester, polyethylene. Alternately, body 226 may include diffractive bodies in the substrate similar to the first embodiment. As noted, body 226 may be formed by molding a suitable polymer, such as a plastic resin, into its desired shape with the diffractive bodies being formed by particles dispersed within the polymer or formed by an agent mixed with the polymer, which agent forms the diffractive bodies upon curing.

While several forms of the invention have been shown and described, other forms will now be apparent to those skilled in the art. It should be understood that application of the target of the present invention is not limited to a specific wavelength—in other words, it is not wavelength specific. Instead, the target of the present invention can be used with a wide range of waves, including laser beams in the non-visible portion of the spectrum. Therefore, it will be understood that the embodiments shown in the drawings and described above are merely for illustrative purposes, and are not intended to limit the scope of the invention which is defined by the claims which follow as interpreted under the principles of patent law including the doctrine of equivalents.

I claim:

1. A device for use with a laser generating unit, said laser generating unit generating a reference laser beam of light, said device comprising:

a construction laser target comprising:

a target body formed from an optical material, said target body having an optical axis; and said target body adapted to diffract the reference laser beam of light directed from the laser generating unit to said target body along said optical axis to provide a diffracted beam of light angled with respect to said optical axis, and said diffracted beam including at least one lobe offset from said optical axis at an angle greater than 40° so that the position of the reference laser beam as it passes through said laser target is more easily detected by the human eye.

2. The device according to claim 1, wherein said angle is greater than 50°.

3. The device according to claim 2, wherein said angle is greater than 60°.

4. The device according to claim 1, wherein said target body diffracts the reference laser beam in a multi-lobe pattern.

5. The device according to claim 4, wherein at least one lobe is angled at an angle greater than 40° from said optical axis.

6. The device according to claim 5, wherein said angle is greater than 50°.

7. The device according to claim 6, wherein said angle is greater than 60°.

8. The device according to claim 4, wherein said multi-lobe pattern includes more than three lobes.

9. The device according to claim 1, wherein said optical material is adapted to diffract the reference laser beam.

10. The device according to claim 9, wherein said optical material includes a plurality of diffractive bodies, said diffractive bodies being sized to diffract the reference laser beam.

11. The device according to claim 10, wherein said diffractive bodies comprises macromolecules.

12. The device according to claim 10, wherein said diffractive bodies are dimensioned in a range of approximately 0.1 microns to 5.0 microns.

13. The device according to claim 12, wherein said diffractive bodies are dimensioned in a range of approximately 0.1 microns to 2.0 microns.

14. A laser target for use with a laser generating unit, said laser generating unit generating a reference laser beam of light, said laser target comprising:

a target body formed from an optical material, said target body having an optical axis; and said optical material adapted to diffract the reference laser beam of light directed to said target body along said optical axis to provide a diffracted beam of light which is more easily visible to a detector, said optical material including a plurality of diffractive bodies, said diffractive bodies being sized to diffract the reference laser beam, wherein said diffractive bodies are dimensioned on the same order of magnitude as a wave length of light of the reference laser beam of light.

15. The laser target according to claim 14, wherein said diffractive bodies comprise generally spherical particles.

16. A device for use with a laser generating unit, said laser generating unit generating a reference laser beam of light, said device comprising:

a construction laser target comprising:

a target body formed from an optical material, said target body having an optical axis, said laser target for diffracting a reference laser beam directed from the laser generating unit to said body along said optical axis; and said body including a plurality of diffractive bodies, said diffractive bodies diffracting the reference laser beam of light directed to said target along said optical axis to produce a diffractive beam having at least one lobe at an angle in a range of about 40° to 90° from said optical axis.

17. The device according to claim 16, wherein said diffractive bodies are dimensioned in a range of about 0.1 microns to 5.0 microns.

18. The device according to claim 17, wherein said diffractive bodies are dimensioned in a range of about 0.1 microns to 2.0 microns.

19. The device according to claim 16, wherein said diffractive bodies each are dimensioned in a range of about 0.1 microns to 5.0 microns.

20. The device according to claim 19, wherein said diffractive bodies vary in their dimensions in said range.

21. The device according to claim 16, wherein said body includes a carrier, said carrier including said diffractive bodies.

22. The device according to claim 21, wherein said carrier comprises a tape.

23. The device according to claim 22, wherein said tape includes a hologram, said hologram including said diffractive bodies.

24. The device according to claim 22, wherein said tape includes submicron dots, said submicron dots comprising said diffractive bodies.

25. The device according claim 16, wherein said target body includes smooth outer surfaces.

26. The device according to claim 16, wherein said diffractive bodies diffract the laser beam in a multi-lobe pattern.

27. A device for use with a laser generating unit, said laser generating unit generating a reference laser beam of light, said device comprising:

a construction laser target comprising:

a target body formed from an optical material, said target body having an optical axis, said laser target for diffracting a reference laser beam directed to said body along said optical axis; and said body including a plurality of diffractive bodies, said diffractive bodies diffracting the reference laser beam of light directed to said target along said optical axis to produce a diffractive beam having at least one lobe at an angle in a range of about 40° to 90° from said optical axis, said diffractive bodies diffracting the reference laser beam of light in a multi-globe pattern, wherein at least one of said lobes extends over a limited angular arc in a range of 0.1 to 0.3 sr wherein said at least one lobe forms a diffractive beam that has a high intensity more readily visible to the human eye.

28. The device according to claim 27, wherein each of said lobes extends over a limited angular arc in a range of 0.1 to 0.3 sr.

29. The device according to claim 28, wherein said lobes extend over an angular arc of about 70°.

30. A laser beam system comprising:

a laser generating unit, said laser generating unit generating a reference laser bean of light; and a laser target having a target body, said target body having a first side, a second side, an optical axis said target body comprising an optical material, said reference laser beam of light being selectively directed toward said target along said optical axis to said first side, and said target body being adapted to diffract said reference laser beam of light and generating a diffracted beam of light through said second side angled away from said optical axis at an angle of greater than about 60° for directing said diffracted beam to a detector.

31. The laser beam system according to claim 30, wherein said laser generating unit generates a green laser beam.

32. The laser beam according to claim 30, wherein said target body includes a plurality of diffractive bodies.

33. The laser beam system according to claim 32, wherein said diffractive bodies are generally spherical.

34. The laser beam system according to claim 33, wherein said diffractive bodies are dimensioned in a range of about 0.1 micron to 5.0 microns.

35. The laser beam system according to claim 32, wherein said diffractive bodies comprise one of a plurality of particles, macromolecules, and submicron dots.

36. The laser beam system according to claim 30, wherein said optical material comprises a polymer.

37. The laser beam system according to claim 30, wherein said target body is adapted to diffract said reference laser beam of light in a multi-lobe pattern.

38. A laser beam system comprising:

a laser generating unit, said laser generating unit generating a reference laser beam of light; and a laser target having a target body, said target body having an optical axis and comprising an optical material, said reference laser beam of light being selectively directed toward said target along said optical axis and said target body being adapted to diffract said reference laser beam of light as a diffracted beam of light angled away from said optical axis at an angle of greater than about 60° for directing said diffracted beam to a detector, said target body including a plurality of diffractive bodies, said diffractive bodies comprising one of a plurality of particles, macro molecules and sub-micron dots, wherein said diffractive bodies are dimensioned on the same order of magnitude as a wave length of said reference laser beam.

39. A device for use with a laser generating unit, said laser generating unit generating a reference laser beam of light, said device comprising:

a construction laser target comprising:

a target body formed from an optical material, said target body having an optical axis, said laser target for diffracting a reference laser beam directed to said body along said optical axis; and said body including a plurality of diffractive bodies, said diffractive bodies diffracting the reference laser beam of light directed to said target along said optical axis to produce a diffractive beam having at least one lobe at an angle in a range of about 40° to 90° from said optical axis, said body including a carrier, said carrier including said diffractive bodies, said carrier comprising a tape, and wherein said diffractive bodies are photo-etched on said tape.

* * * * *

UNITED STATES PATENT AND TRADEMARK OFFICE
CERTIFICATE OF CORRECTION

PATENT NO. : 6,622,392 B1 Page 1 of 1
APPLICATION NO. : 09/527372
DATED : September 23, 2003
INVENTOR(S) : Paul L. Bourget It is certified that error appears in the above-identified patent and that said Letters Patent is hereby corrected as shown below:

Column 1:
Line 4, ",", should be --;-- after "LASER".

Column 10:
Line 49, Claim 30, "bean" should be --beam--.

Signed and Sealed this

Twelfth Day of August, 2008

JON W. DUDAS
*Director of the United States Patent and Trademark Office*